July 26, 1955 — P. J. COYLE — 2,713,817

CULTIVATOR SHIELD EQUALIZER

Filed March 14, 1952

INVENTOR
PAUL J. COYLE

BY
McMorrow, Berman & Davidson
ATTORNEYS

United States Patent Office 2,713,817
Patented July 26, 1955

2,713,817

CULTIVATOR SHIELD EQUALIZER

Paul J. Coyle, St. Paul, Minn.

Application March 14, 1952, Serial No. 276,503

1 Claim. (Cl. 97—183)

This invention relates to cultivators, and more particularly, has reference to a device attachable to a cultivator shield, for retaining said shield at a selected elevation above the ground surface, which elevation will be maintained despite unevenness encountered in the ground surface during movement of the shield thereover.

Heretofore, it has been difficult to cultivate small plants without covering a portion of the plants, and additionally, it has been difficult, during the cultivation of said small plants, to cause a sufficient amount of soil to be passed under the cultivator shields and around the plants.

These difficulties have existed by reason of the fact that conventionally, shields are fastened to a cultivator in such a manner as to cause the front and rear wheels of a tractor on which the cultivator is mounted to regulate, as a matter of practical effect, the height of the shields. As a result, when the tractor is moving over uneven soil, the up-and-down movement of the wheels of the tractor is transmitted to the shields, causing the shields to have a corresponding up-and-down movement that prevents the shields from being held to a uniform, spaced relation to the ground surface.

In view of the above, it is the main object of the present invention to provide equalizer means attachable to the shields of a cultivator, that will be so formed as to cause the shields to be positioned at a selected elevation above the ground surface, said means being so formed as to maintain with a desirable amount of uniformity the spacing of the shield from the ground surface, despite unevenness in the ground surface.

Another important object is to provide equalizer means of the character referred to that can be attached to conventionally formed cultivator shields, without requiring the modification or redesigning of said shields.

Still another important object is to provide cultivator shield equalizers that will be individually associated with the several shields of a cultivator, so as to cause each shield to conform to the ground contour, independently of any other shield.

Still another object of importance is to provide cultivator shield equalizers in the form of elongated rod members, said rod members being so connected to their associated shields as to be adjustable to selected positions, whereby to permit the shields to be preset at a selected elevation above the ground surface.

Other objects will appear from the following description, the claim appended thereto, and from the annexed drawing, in which like reference characters designate like parts throughout the several views, and wherein:

Figure 1:
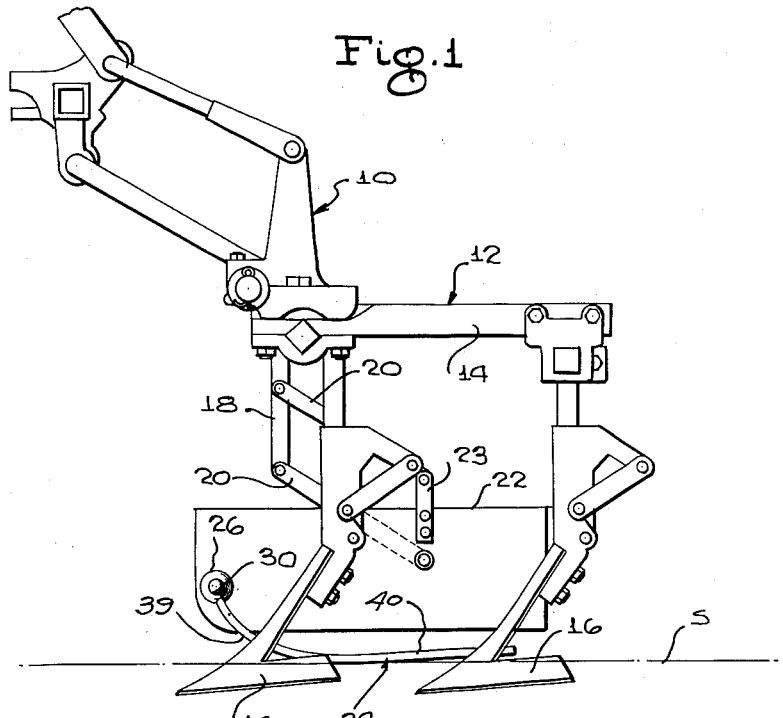
Figure 1 is a side elevational view of a cultivator shield equalizer formed in accordance with the present invention, as it appears when mounted upon a cultivator having a shield of the floating type.
Figure 2:
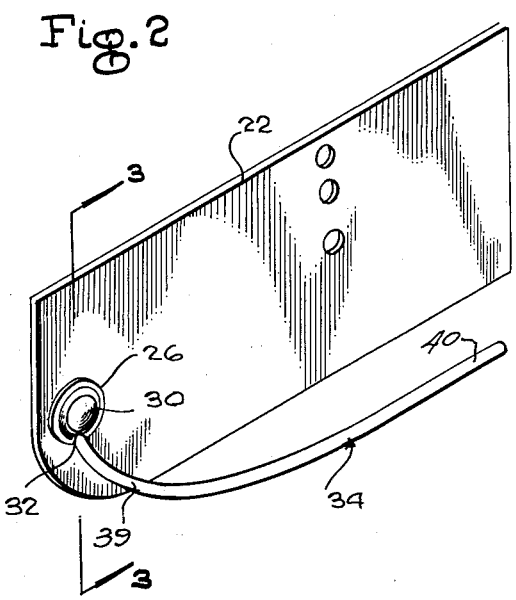
Figure 2 is an enlarged perspective view of the cultivator shield and its associated equalizer member.

In the drawings is illustrated a universal mounting frame 10, adapted to be mounted upon a conventional tractor, not shown, said frame being of fairly conventional construction and being of the type that permits a cultivator designated generally at 12 to retain a proper pitch regardless of the depth at which it operates.

The cultivator implement 12 is also of conventional design, and includes a plurality of cultivator sweep support arms 14, only one of which has been illustrated. Cultivator sweeps 16 are mounted upon the arms 14 and are adapted to extend into the ground surface S.

Constituting a part of the cultivator 12 is a depending cultivator shield suspension arm 18, having parallel links 20 pivotally connected thereto at locations spaced vertically of said suspension arm.

A cultivator shield 22 is of flat, generally rectangular configuration, and is connected to the links 20.

As will be noted from Figure 1, the connection of the shield 22 to the suspension links 20 is accomplished by pivotally joining the lower of said links directly to the shield, the upper link being pivotally connected to an upstanding, flat bracket 23 fixedly secured to the shield 22 intermediate the opposite ends thereof. In this way, a parallelogram linkage is provided, that maintains the horizontality of the shield 22 in any position to which the shield is adjusted upwardly or downwardly relative to the ground surface S.

The illustrated shield arrangement is representative of a shield of the floating type, which is permitted to float upwardly during movement thereof over the ground surface, but is limited as to the downward movement allowed therefor.

It has been found that a shield of the type stated will be disposed at continuously varying distances from the ground surface S, when uneven ground is encountered, due to the fact that in the final analysis, the height of the shield depends upon the front and rear wheels of the tractor, said wheels riding upwardly and downwardly when the ground contour becomes uneven. This is undesirable, since it results in a failure on the part of the shield to protect small plants, and also prevents the mounding of sufficient dirt against the plants. In other words, if the shield 22 rides upwardly to an excessive extent, the plants are exposed and left unprotected. On the other hand, if the shield shifts downwardly to an undesirable extent, it is not possible for the dirt to be thrown thereunder into a plant-protecting position.

To eliminate these undesirable characteristics of a conventional cultivator shield mounting, I have provided means for equalizing the several shields 22 of a cultivator, whereby said shields will be maintained at all times at a particular distance from the ground surface, even though said surface is uneven.

To this end, there is an opening 24 in the cultivator shield 22, at the front end thereof, said opening being disposed substantially intermediate the upper and bottom edges of the shield. A dished or concavo-convex washer 26 is positioned against one face of the shield, and has a center aperture 28 that is in registry with the opening 24, the registered opening and aperture receiving a clamping bolt 30. The bolt 30 is loosely positioned through the opening of the shield and the aperture of the washer, and projects through the shield to receive a washer 36 and a nut 38.

The washer 26 is rotatably adjustable upon the bolt 30, and after said washer has been adjusted to a selected position, it is clamped fixedly to the shield 22 by means of the nut 38 which, when turned in the direction of the shield 22, causes the head of the clamping bolt to force the center portion of the washer 26 against the shield to bind the washer tightly to the shield.

Formed in the washer 26 is a radial slot 32 extending inwardly from the periphery of said washer, said slot receiving the front end of an equalizer formed as a rod member and designated generally by the reference numeral 34. Said front end of the rod member 34 is fixedly secured, by welding or other fastening means, to the washer 26, so that on rotatable adjustment of the washer, said rod member will be adjusted toward and away from the bottom edge of the shield. The rod member extends longitudinally of the shield, and is formed with a front end portion 39 that is gradually curved, said front end portion merging into a straight rear end portion 40 that extends longitudinally of and below the bottom edge of the cultivator shield and rides upon the ground surface S during movement of the cultivator over said surface.

Figure 3:
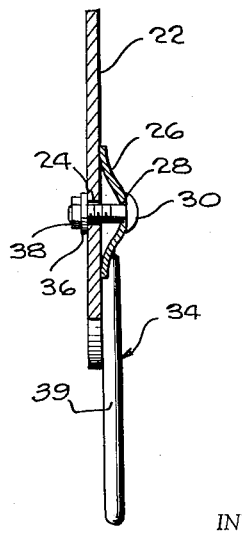
Figure 3 is a sectional view taken on line 3—3 of Figure 2, the scale being enlarged still further.

As will be noted from Figure 3, the shield 22 is disposed in a vertical plane, the rod member 34 being arranged in a plane substantially common to that of the shield and being adjustable in said plane, through the medium of the clamping washer 26, toward and away from the bottom edge of the shield. This varies the spacing of the shield from the ground surface S to any extent desired, and by locating the rod member in a selected position of adjustment, the shield 22 will be spaced uniformly from the ground surface S despite any unevenness in ground contour that may be encountered.

The end result is that the uniform spacing of the several shields 22 of a cultivator will be effective to cause said shields to be disposed in protective relation to the plants being cultivated at all times, and will further be effective to permit dirt to be thrown under the shields in the desired amount for the purpose of protecting said plants.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claim.

What is claimed is:

In a cultivator shield, a normally vertical plate having a longitudinal lower edge, and a front end, said plate being provided with a hole therethrough above said lower edge and adjacent to said front end, an equalizer rod having an upturned forward end and a rearward portion spaced below said lower edge, a dished compressible washer fixed on the forward end of the rod, a bolt having a shank including a head, said shank being extended through the compressible washer and through said hole in the plate with said head engaging said compressible washer, with said compressible washer engaged with one side of said plate, a flat washer on said shank and engaging the opposite side of the plate, and a nut threaded on the shank and forcing the washers into engagement with the opposite sides of the plate with said compressible washer under compression against the said one side of the plate.

References Cited in the file of this patent

UNITED STATES PATENTS

| | | |
|---|---|---|
| 478,074 | Jones | June 28, 1892 |
| 914,237 | Browning | Mar. 2, 1909 |
| 937,674 | Browning | Oct. 19, 1909 |
| 961,591 | Ertel | June 14, 1910 |
| 1,595,270 | Walker | Aug. 10, 1926 |
| 2,513,543 | Wright | July 4, 1950 |